Patented June 16, 1936

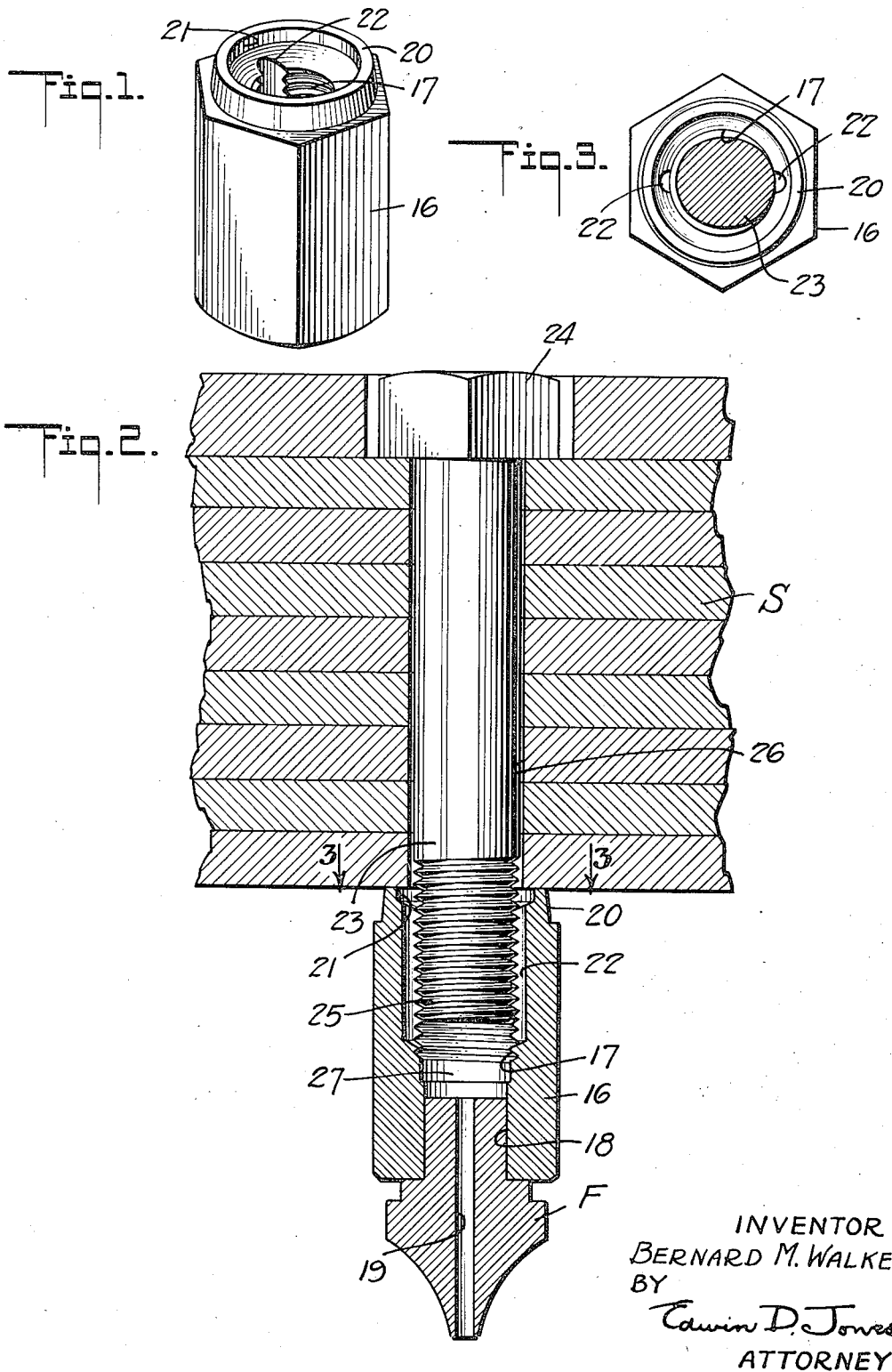

2,044,375

UNITED STATES PATENT OFFICE 2,044,375

LUBRICATOR ADAPTER FOR SPRINGS

Bernard M. Walker, Los Angeles, Calif.

Application October 7, 1935, Serial No. 43,929

1 Claim. (Cl. 267—50)

My invention relates to adapters for facilitating application to the relatively movable parts of a member, of oil or other lubricant through the use of any conventional force feed lubricating device, and it has particular reference, although not necessarily, to such adapters as may be used in the lubrication of leaf springs for vehicles.

It is a purpose of my invention to provide a lubricator adapter for leaf springs which is structually characterized by its simplicity and ready adaptability to the conventional tie bolt of a leaf spring, and functionally characterized by its ability when associated with the tie bolt, to permit oil to be forced into the spring around the tie bolt and thence between the several leaves of the spring in quantity sufficient to adequately lubricate the spring.

I will describe only one form of lubricator adapter for leaf springs and the like, embodying my invention, and will then point out the novel features thereof in claim.

In the accompanying drawing:

Fig. 1 is a view showing in perspective one form of lubricator adapter embodying my invention.

Fig. 2 is a view showing my lubricator adapter in longitudinal section and in applied position to a tie bolt of a leaf spring and a lubricator fitting, the fitting and spring being shown in section.

Fig. 3 is a transverse sectional view taken on the line 3—3 of Fig. 2 and looking in the direction of the arrows.

In carrying out my invention, I provide a lubricator adapter which comprises an elongated metal body 16 bored and exteriorly faceted to form in effect a nut. The bore of this body or nut has a portion 17 which is threaded for the reception and attachment thereto of the threaded end of the shank of a bolt. The remaining portion 18 of the bore is left smooth to receive and retain by a driving fit a conventional form of lubricator fitting F having an opening or passage 19 therethrough, as clearly shown in Fig. 2.

At the inner end of the nut or that end opposite from the fitting F the nut is formed with an annular collar 20 which is concentrically spaced from the bore of the nut to provide an intervening annular chamber 21 beyond the body of the nut. One or more grooves 22 are formed in the threaded portion 16 of the bore. In the present instance, I have shown two such grooves extending lengthwise of the bore and disposed at diametrically opposed points therein, with their outer ends in communication with the chamber 21.

The adapter described is susceptible of application to any form of conventional bolt which extends through a member having relatively movable parts that require lubrication, and where the bolt head seals one end of the bolt receiving opening in the member. In Fig. 2, I have shown such a combination of elements. The member is the leaf spring S such as is used on vehicles for supporting the body on the frame. The bolt is of conventional form having a solid shank 23 provided with a head 24 at one end and screw-threaded at the other end as indicated at 25.

The bolt shank 23 extends through an opening 26 of all of the spring leaves, with its head 24 uppermost and sealing the upper end of the opening against the escape of oil. The threaded end 25 projects from the lower side of the spring for application of my adapter. Thus it becomes apparent that the bolt is one of the conventional tie bolts used for securing the leaves of the spring together.

My adapter carrying the fitting F, is screwed onto the projecting end of the bolt until the collar 20 bites into the spring to form an oil-tight joint between the two. As a result of this operation the bolt head 24 is drawn into oil-tight engagement with the upper side of the spring, and thus the opening 26 is sealed at both ends against the escape of oil and the chamber 21 closed by the spring.

It is important to note that the relative length of the nut in respect to the projecting end of the bolt is such that a chamber 27 is formed between the threaded shank end 25 and the inner end of the fitting F. This chamber 27 is in communication with both of the grooves 22 which latter now form ducts by being closed at their confronting sides by the bolt shank to provide communication between the chamber 27 and the chamber 21.

Upon application of an oil gun or other form of force-feed lubricating device to the fitting F, the lubricant can be forced through the fitting passage 19 into the chamber 27, whence it rises through the ducts 22 to the chamber 21. In this chamber the oil is distributed uniformly to rise uniformly about the bolt shank and penetrate the minute space provided between the bolt shank and the wall of the opening 26. From this space the oil is distributed to the interstices between the leaves of the spring to effectively lubricate the spring.

Alhough I have herein shown and described only one form of lubricator adapter for leaf springs, it is to be understood that various changes and modifications may be made herein without departing from the spirit of my invention and the spirit and scope of the appended claim.

I claim:

As an article of manufacture, an adapter comprising a nut the bore of which has a portion threaded and formed with grooves intersecting the threads and communicating with one face of the nut, and a collar on that face of the nut with which the grooves communicate, said collar being concentric of and spaced from the bore of the nut.

BERNARD M. WALKER.